United States Patent [19]  
Goody

[11] Patent Number: 4,482,335  
[45] Date of Patent: Nov. 13, 1984

[54] FLEXIBLE COUPLINGS

[75] Inventor: Edward W. Goody, Weybridge, England

[73] Assignee: Torsiflex Limited, England

[21] Appl. No.: 482,269

[22] Filed: Apr. 5, 1983

Related U.S. Application Data

[63] Continuation of Ser. No. 177,466, Aug. 12, 1980, abandoned.

[30] Foreign Application Priority Data

Dec. 18, 1979 [GB] United Kingdom ................ 7943494

[51] Int. Cl.³ .............................................. F16D 3/78
[52] U.S. Cl. ........................................ 464/94; 464/99
[58] Field of Search .............................. 464/94, 98, 99

[56] References Cited

U.S. PATENT DOCUMENTS

| 293,141 | 2/1884 | Brotherhood | 464/99 |
| 1,326,993 | 1/1920 | Thomas | 464/99 |
| 3,800,557 | 4/1974 | Tobin | 464/94 |
| 4,019,346 | 4/1977 | Fukuda | 464/69 X |
| 4,055,966 | 11/1977 | Fredericks | 464/99 |
| 4,096,711 | 6/1978 | Carlson et al. | 464/99 |
| 4,214,457 | 7/1980 | Wade et al. | 464/99 |

FOREIGN PATENT DOCUMENTS 779357 7/1957 United Kingdom ................ 464/99

Primary Examiner—Stuart S. Levy  
Assistant Examiner—Daniel P. Stodola  
Attorney, Agent, or Firm—Roylance, Abrams, Berdo & Goodman

[57] ABSTRACT

A flexible coupling for transmitting rotational drive includes two components coupled together by links which are rigid radially but permit a limited axial and/or angular movement. The links are connected to the respective components by driving connections extending through openings in the links. Areas of the links other than those associated with the driving connections engage accurately and securely under and/or over the corresponding area on or connected to the respective components.

17 Claims, 13 Drawing Figures

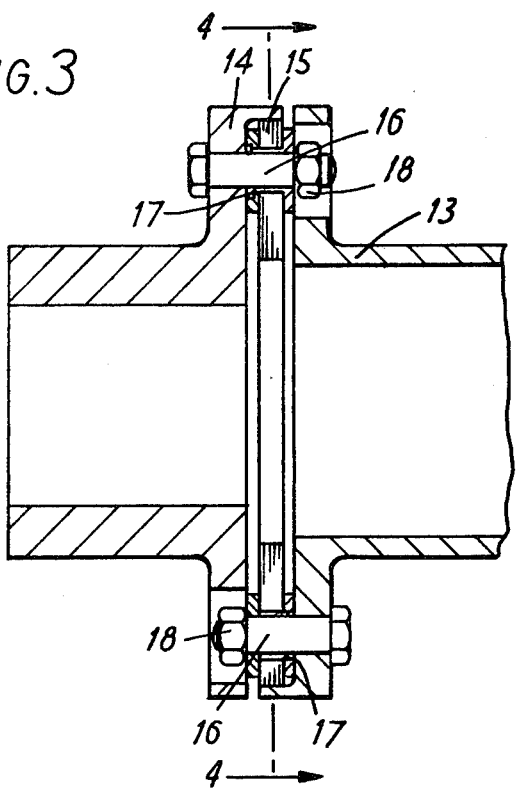
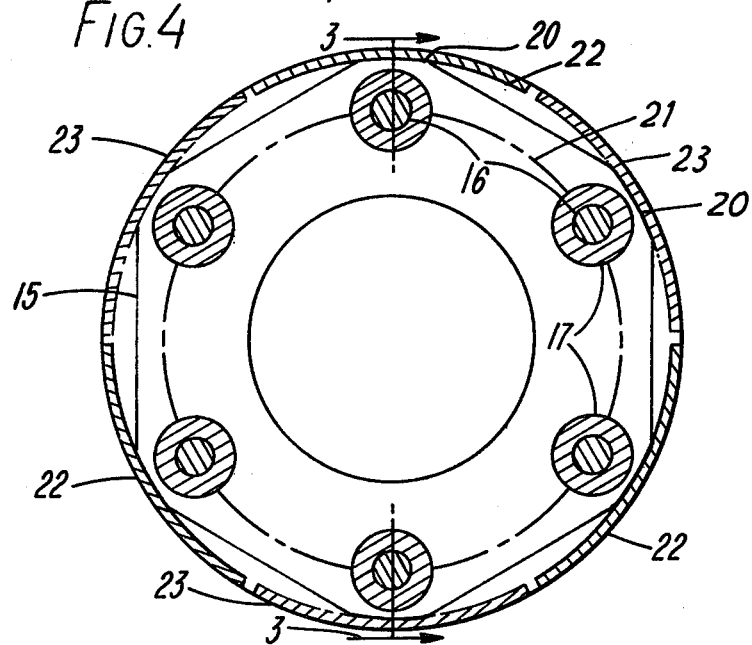

FLEXIBLE COUPLINGS

This is a continuation of application Ser. No. 177,466, filed Aug. 12, 1980, now abandoned.

This invention relates to flexible couplings for transmitting rotational drive and is particularly concerned with couplings of the kind comprising two components which are coupled together by links of flexible resilient material, the links being connected respectively to each component normally at points lying substantially on a pitch circle about the axis of rotation of the components.

Coupings of this kind are for example described in British Patent Specification Nos. 923,141, 1,066,984, and 1,084,956. With such couplings and particularly high speed couplings problems have arisen in maintaining the balance of the unit for the reasons set out below.

FIG. 1 shows a typical prior art joint between one component of such a coupling and the flexible link, the flexible link being connected to the second component by a similar such joint spaced angularly with respect thereto. In this figure the flexible element which is composed of a number of laminations as indicated at 1 and is connected to the one component indicated at 2 by means of a bolt 3 which passes through a bush 4 and is secured by a nut 5 mounted in an opening 6 in the second component 7.

With this coupling a problem has been that even with very close fits between the various components machining tolerances and wear can allow a radial movement of the spacer which for example may be component 2. Slight clearances can occur between the bolt 3 and the opening in the component 2 as indicated at A, as well as between the bolt 3 and the bush 4 as indicated at B and between the sleeve 4 and the laminations of the element 1 as shown at C. This can occur at each bolted joint and even with the closest practical fits radial movements can occur.

FIG. 2 shows one proposal for eliminating some of the problems encountered with arrangements shown in FIG. 1. This proposal is to have two machined rings indicated at 8 and 10 which have their radially outer surfaces 8a and 10a machined to engage correspondingly machined surfaces in component 11 corresponding to component 2 and in component 12 corresponding to component 7. With this arrangement the importance of the fits at D, E & F are still vital although the fit between the component 11 and the ring 8 can be a slight intereference and so eliminating the chance of radial movement.

According to the present invention a flexible coupling for transmitting rotational drive comprises two components which are coupled together by radially rigid links permitting limited axial and/or angular movement and connected to the respective components by driving connections extending through openings in the links, in which areas of the links other than those associated with driving connections engage accurately and securely under and/or over corresponding areas on or connected to the respective components.

Preferably the areas of the links engaging the areas associated with the respective components are situated adjacent driving connections to that component, and the areas of the links may directly engage the areas of the components.

Normally, the engaging areas of the links and components will be axially directed but in some cases they may have tangential components.

Preferably the areas may be machined to engage accurately with one another, and in which case the areas are conveniently machined about a centre on the axis of rotation and engage with correspondingly machined areas in the respective components.

The exterior surfaces of the links may engage the respective components alternately.

The areas of the links may comprise interior surfaces on the links engaging exterior surfaces on the respective components. Alternatively exterior areas on the links may engage interior surfaces in the respective components.

In one arrangement the exterior surfaces of the flexible links may engage side plates which are accurately located on the respective components, as for example when they are in the form of rings and are accurately located by being in transition or interference fit on shoulder portions (or register diameters) on the components. The connection between the side plates and the flexible links is preferably spaced beyond the ends of the components.

The areas on the exterior surfaces of the links may engage under portions shrunk onto the respective components, and in one arrangement the side plates may be located by the driving members on the sides of the flanges on the components remote from the flexible link.

An adaptor plate may be included coupled to the end flange of one of the components and carrying the means for accurately locating the flexible links.

With the present invention by accurately locating the links with respect to the components the spacer is accurately located relative to the driving or driven member by means of the machined interengaging portions which are relatively easy to machine and are not subject to wear during running. Thus no reliance need be placed on mechanical fits between bolts and flange bolt and bush or bush and laminations, and in fact satisfactory performance can be achieved even with clearance between all these parts.

The invention may be performed in various ways and a number of embodiments will now be described by way of example with reference to the accompanying drawings in which FIG. 1 is a section through a typical joint between the flange and the flexible element of a prior art coupling.

FIG. 3 is a cross-section through a coupling according to the present invention.

FIG. 4 is an end elevation, in partial section, along line 4—4 of FIG. 3.

Figure 1:
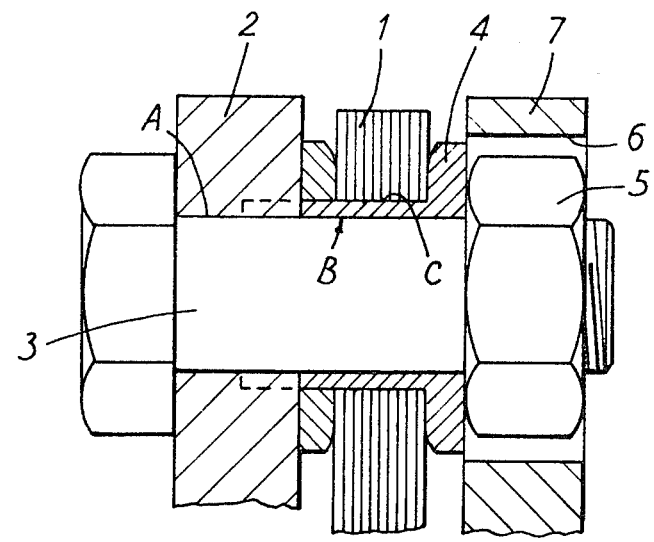
Figure 2:
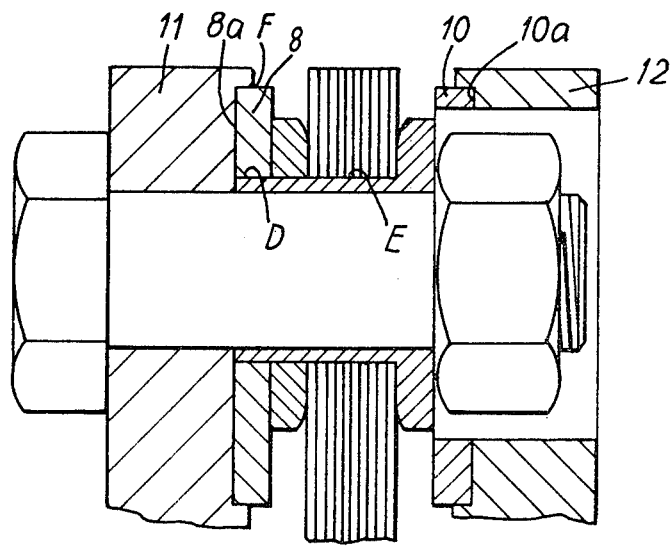
FIG. 2 is a similar view to FIG. 1 of another prior art coupling.

In the arrangement shown in FIGS. 3 & 4 the coupling comprises a component 13 in the form of a spacer connected to a component 14, in the form of a hub, the upper half of the figure showing the connection of the flexible links 15 to the component 14 and the bottom half showing the connection of the links to the component 13.

Each connection comprises a bolt 16 passing through a bush 17 in an opening in the link and secured to a nut 18.

Each of the laminations forming the links is machined as shown at 20 to an accurate diameter concentric with the pitch circle 21 of the attachment holes.

The hub 14 and the spacer 13 are machined to have accurately dimensioned recesses in the front faces thereof to accept over half the thickness of the laminated stack forming the flexible element and of a diameter to be a transition or slight interference fit with the outside diameter of the laminations. As the outer rims of the hub and spacer will now overlap these are cut away at intervals so as to be interlocking but with angular clearance and are in the form of a series of axially projecting arcuate shaped segments shown at 23 on the spacer and 22 on the hub.

The flexible element is thus fitted alternately between the hub and the spacer at a point adjacent to that at which it is attached to the associated flange, so that full angular and axial freedom is maintained.

By this means a spacer is accurately located relative to the driving or driven member by means of machined diameters which are relatively easy to machine and are not subject to wear during running. No reliance is now placed on machining mechanical fits between bolt and flange bolt and bush or bush and laminations. In fact satisfactory performance is maintained if clearance exists between all these parts.

Figure 5:
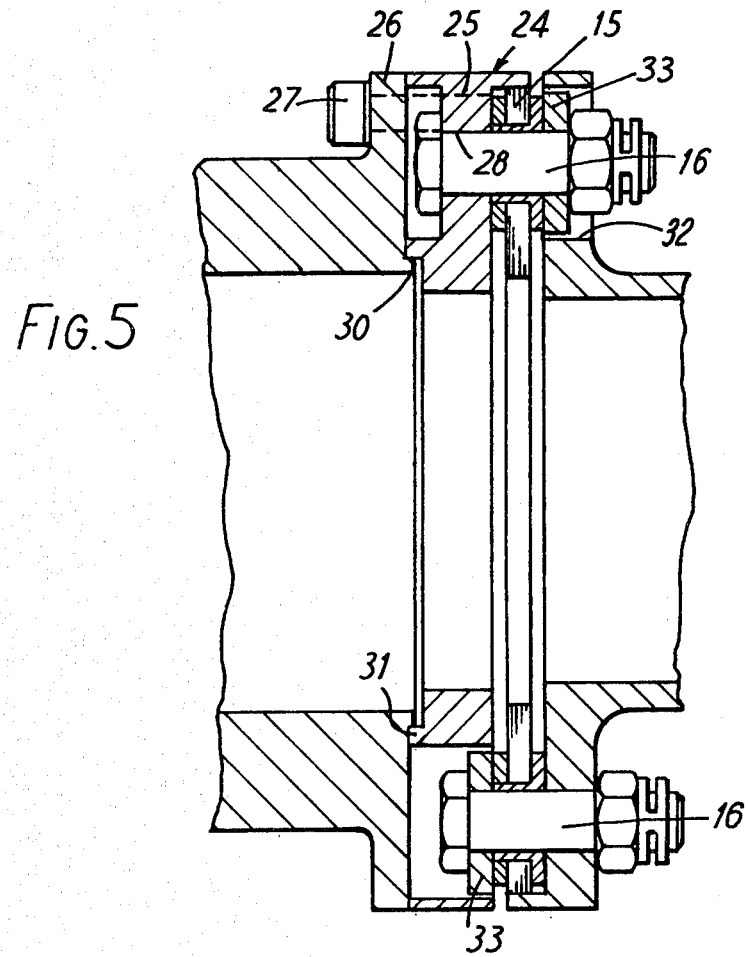
FIG. 5 is a coupling showing a removable centre secion

This arrangement can be assembled in the axial direction either where a spacer with a removable centre section is used or using adaptor plates which are shown in FIG. 5 at 24. These adaptor plates are arranged to be secured to the driving or driven hub flange by means of bolts extending through openings 25 and which can be assembled subsequently.

In this arrangement the adaptor plate 24 carries the flexible links 15 and has a flange with projecting arcuate segments in a similar manner to spacer 13. However, the adaptor plate 24 itself constitutes in effect the end flange of the spacer and is coupled to flange 26 on the spacer by means of bolts 27 extending into the bores 25 in the plate 24. The bolts 16 extend through the bores 28 in the plate 24.

In this construction, as in subsequent constructions, alternate portions of the hub and spacer are angularly spaced but mesh with one another, and in the event of flexible link failure the meshing porions will interlock and will constitute an emergency drive. Also in this construction and in all constructions except those shown in relation to FIGS. 12 and 13 as the intermeshing portions cover between them substantially the whole of the axial extent of the flexible link they will provide an antiflail device so that any broken portion of the link cannot be allowed to flail outwards.

Also in this arrangement the hub has an axially directed location or register diameter 30 adapted to fit inside or vice versa an axially directed location or register diameter 31 on the adaptor plate which acts as locating means.

Moreover, in this construction each of the bolts 16 is provided with a washer 33 which is received in an opening 32 in the component which is not connected to the bolt in question. These washers in the openings can also provide an emergency drive in the event of flexible link failure the washers engaging the sides of the opening in the other component. The washers may be made of a non-ferrous material to avoid sparking.

Figure 6:
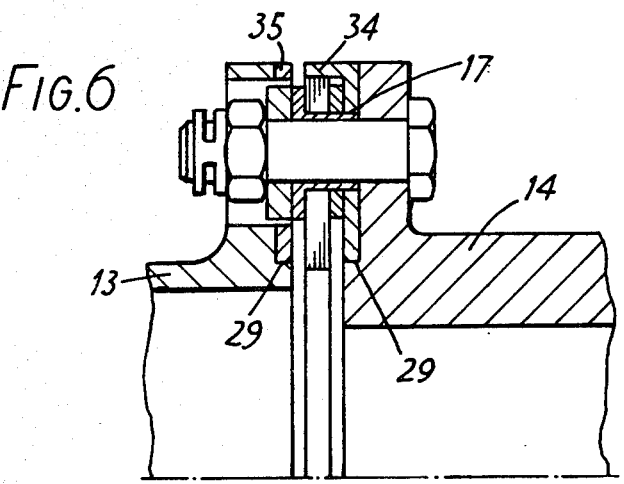
FIG. 6 is a section through a joint for use in a coupling according to the present invention showing an alternative method using side plates.

FIG. 6 shows a modified construction in which side plates 35 and 34 are provided respectively on components 13 and 14. The side plates are themselves machined to fit with the flexible links in a similar manner to the components 13 and 14 in the construction of FIGS. 3 and 4. The side plates are in the form of rings and are located with respect to the respective components on register diameters forming shoulders as at 29 having a transition or slight interference fit. The bush 17 thus only serves to keep the various components as an assembly and not as a location.

Figure 7:
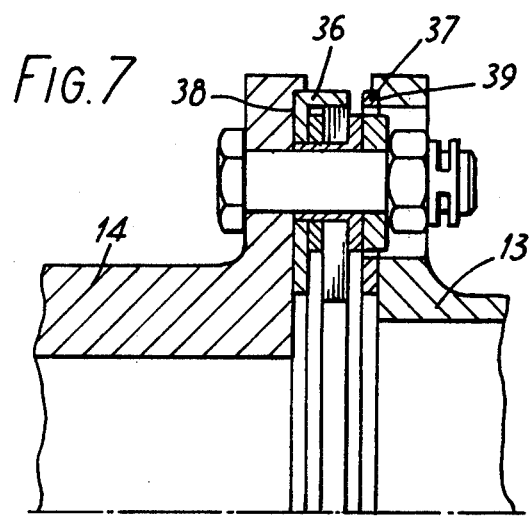
FIGS. 7, 8 and 9 are similar views to FIG. 6 of further alternative constructions.

FIG. 7 is a similar view to FIG. 6 but in this construction side plates 36 and 37 are located in recesses 38 and 39 in the components 13 and 14 and extend beyond the end of the coupling members so that the flexible links are outside the flanges on the coupling members. The side plates are fitted into recesses 38 and 39 with similar transition or interference fit so as to locate them accurately.

Figure 8:
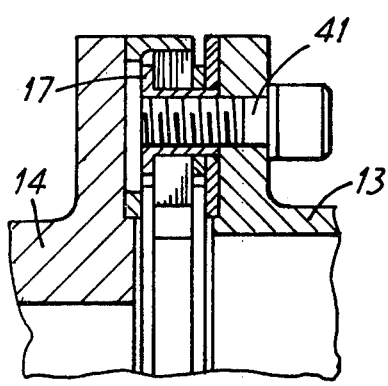

FIG. 8 shows a similar arrangement to FIG. 7 in which the bolt 16 is replaced by a bolt 41 passing through an opening in component 13 and being a screw threaded fit in bush 17 which retains the assembly in position, the side plates again being in the form of rings and retained as in FIG. 6.

Figure 9:
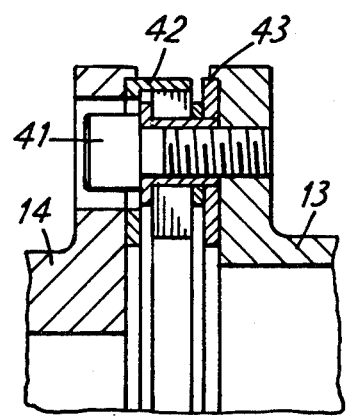

FIG. 9 is a similar arrangement to FIG. 8 but with the side plates 42 and 43 recessed in the components as in the construction of FIG. 7.

Figure 10:
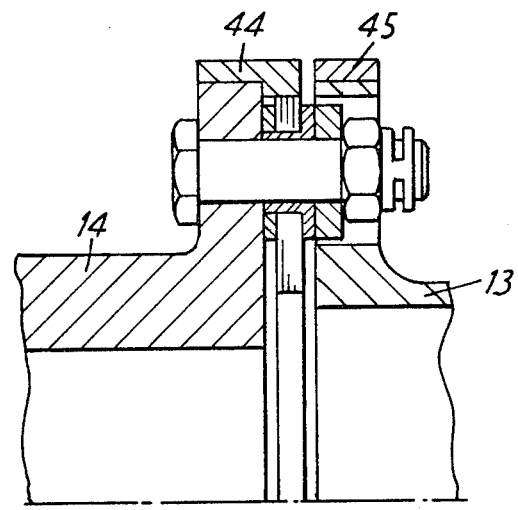
FIG. 10 is a similar view of another construction.

FIG. 10 shows a construction in which rings 44 and 45 are shrunk on to the outside flanges and machined to fit the outside diameter of the flexible element 15. This arrangement is particularly suitable for use in retro-fit operations in existing units.

Figure 11:
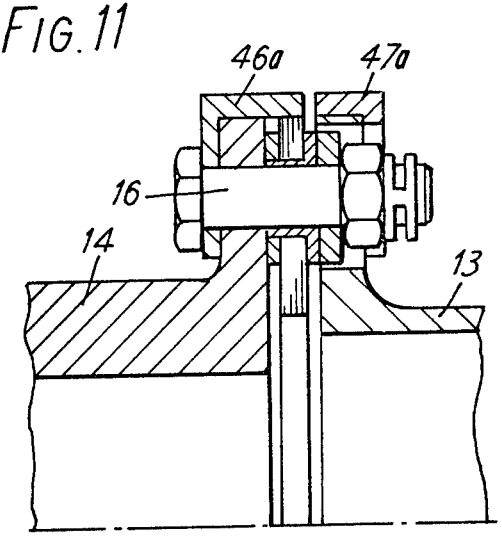
FIG. 11 is a similar view of a further alternative construction.

FIG. 11 is yet a further alternative construction in which side plates 42a and 47a are located on the outside diameter of the flanges of a component, extended down the back and are retained by the drive bolts 16 which can be removed axially to allow removal of the flexible element.

Figure 12:
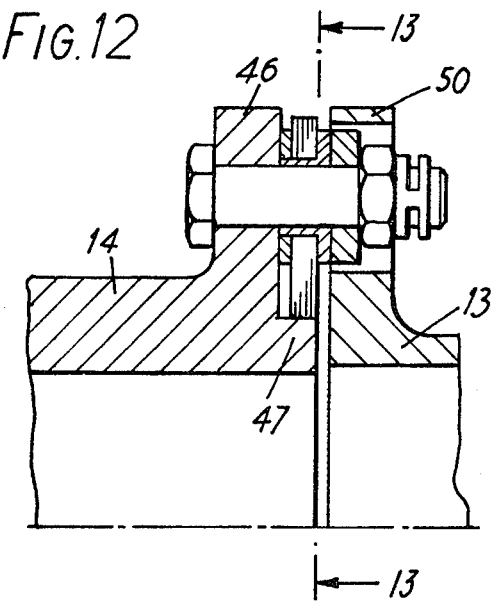
FIG. 12 is a similar view of another construction.
Figure 13:
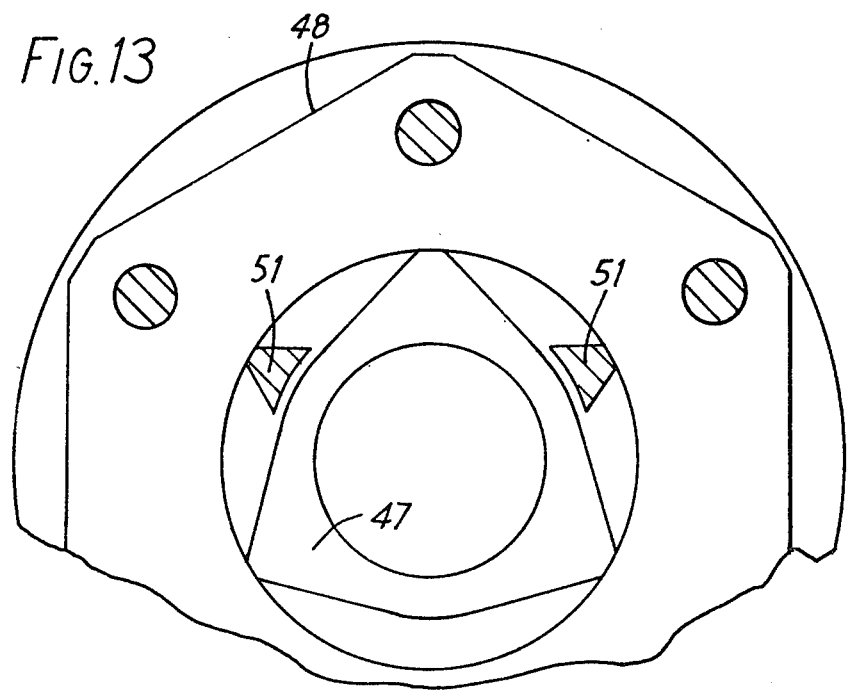
FIG. 13 is a sectional view along line 13—13 of FIG. 12.

In FIGS. 12 and 13 is shown a somewhat different construction from those described above. In this construction flange 46 on hub 14 has an internally projecting locating piece 47 accurately machined to engage the accurately machined interior of flexible link 48 at three equally angularly spaced locations. Flange 50 on spacer 13 has three projections 51 extending from it adapted to engage three locations on the interior of the flexible link 48, and equally angularly spaced, and also alternating with the engaging locations on the locating piece 47.

It will be appreciated that in all cases the areas of the links connected to the respective components are situated adjacent driving connections to that component. Normally, the areas on or connected to the components engaging the areas of the flexible links are spaced equidistant and on either side of the respective driving bolts on that component.

I claim:

1. A flexible coupling for transmitting rotational drive comprising first and second rotatable components connectable, respectively, to driving and driven devices; and means for coupling said first and second components together in driving and driven relationship including a radially rigid link having sufficient non-radial flexibility to permit limited axial and angular relative movement between said first and second components, means for connecting said link to said first component at a first plurality of angularly spaced driving locations and for connecting said link to said second component at a second plurality of angualarly spaced driving locations angularly offset from said first plurality of locations, all of said first and second pluralities of locations lying on substantially the same circle, said link having a plurality of radially facing, axially extending bearing surfaces, and first and second sets of radially facing, oppositely directed bearing surfaces on said first and second components, respectively, concurrently engaging said bearing surfaces on said link, said first and second sets directly contacting and extending axially from said first and second components, respectively, said bearing surfaces of each of said sets being fixedly positioned relative to one another, all of said bearing surfaces lying in substantially the same cylinder, whereby said components are maintained in axial alignment without regard for wear at said first and second pluralities of locations.

2. A flexible coupling according to claim 1 wherein said bearing surfaces on said link engaging the surfaces associated with each of the respective components are situated adjacent driving locations for that component.

3. A flexible coupling according to claim 1 or claim 2 in which the bearing surfaces of said link directly engage the bearing surfaces of the components.

4. A flexible coupling according to one of claims 1 or 2 including an adaptor plate coupled to the end flange of one of the components and carrying said bearing surfaces for accurately locating the flexible link.

5. A flexible coupling according to one of claims 1 or 2 in which said means for coupling includes means for providing an emergency drive in the event of flexible link failure.

6. A flexible coupling according to one of claims 1 or 2 in which the bearing surfaces are machined to engage accurately with one another.

7. A flexible coupling according to claim 6 in which said bearing surfaces on said link is machined about a center of the axis or rotation and engage with corresponding machined surfaces on the respective components.

8. A flexible coupling as claimed in claim 6 in which said bearing surfaces of said link alternately engage the respective components.

9. A flexible coupling according to claim 8 in which said bearing surfaces on said link comprise interior surfaces on the link engaging exterior surfaces in the respective components.

10. A flexible coupling according to claim 8 in which said bearing surfaces on said link comprises exterior surfaces engaging interior surfaces on the respective components.

11. A flexible coupling according to claim 10 in which the exterior surfaces of said flexible link engages side plates which are accurately located on the respective components.

12. A flexible coupling according to claim 11 in which the side plates are rings accurately located by interference fit on shoulder portions on the components.

13. A flexible coupling according to claim 11 in which the connection between the side plates and the flexible link is spaced beyond the ends of the components.

14. A flexible coupling according to claim 11 in which the exterior bearing surfaces of the link engages under portions shrunk on to the respective components.

15. A flexible coupling according to claim 11 in which the side plates are located by driving members on the sides of flanges on the components remote from the flexible link.

16. A flexible coupling for transmitting rotational drive comprising first and second rotatable components connectable, respectively, to driving and driven devices; and means for coupling said first and second components together in driving and driven relationship including a radially rigid link having sufficient non-radial flexibility to permit limited axial and angular relative movement between said first and second components, means for connecting said link to said first component at a first plurality of angularly spaced driving locations and for connecting said link to said second component at a second plurality of angularly spaced driving locations angularly offset from said first plurality of locations, all of said first and second pluralities of locations lying on substantially the same circle, said link having a plurality of radially facing, axially extending bearing surfaces, and first and second sets of radially facing, oppositely directed bearing surfaces on said first and second components, respectively, concurrently engaging said bearing surfaces on said link, said first and second sets formed as unitary parts of and extending axially from said first and second components, respectively, said bearing surfaces of each of said sets being fixedly positioned relative to one another, all of said bearing surfaces lying in substantially the same cylinder, whereby said components are maintained in axial alignment without regard for wear at said first and second pluralities of locations.

17. A flexible coupling for transmitting rotational drive comprising first and second rotatable components connectable, respectively, to driving and driven devices; and means for coupling said first and second components together in driving and driven relationship including a radially rigid link having sufficient non-radial flexibility to permit limited axial and angular relative movement between said first and second components, said link having a first thickness in an axial direction, means for connecting said link to said first component at a first plurality of angularly spaced driving locations and for connecting said link to said second component at a second plurality of angularly spaced driving locations angularly offset from said first plurality of locations, all of said first and second pluralities of locations lying on substantially the same circle, said link having a plurality of radially facing, axially extending bearing surfaces, and first and second sets of radially facing, oppositely directed bearing surfaces on said first and second components, respectively, concurrently engaging said bearing surfaces on said link over substantially all of said first thickness, said first and second sets directly contacting and extending axially from said first and second components, respectively, said bearing surfaces of each of said sets being fixedly positioned relative to one another, all of said bearing surfaces lying in substantially the same cylinder, whereby said components are maintained in axial alignment without regard for wear at said first and second pluralities of locations.

* * * * *